United States Patent
Tie et al.

(10) Patent No.: US 8,312,278 B2
(45) Date of Patent: Nov. 13, 2012

(54) ACCESS AUTHENTICATION METHOD APPLYING TO IBSS NETWORK

(75) Inventors: Manxia Tie, Xi'an (CN); Jun Cao, Xi'an (CN); Xiaolong Lai, Xi'an (CN); Jiandong Li, Xi'an (CN); Liaojun Pang, Xi'an (CN); Zhenhai Huang, Xi'an (CN)

(73) Assignee: China Iwncomm Co., Ltd., Shaanxi (CN)

( * ) Notice: Subject to any disclaimer, the term of this patent is extended or adjusted under 35 U.S.C. 154(b) by 235 days.

(21) Appl. No.: 12/740,082

(22) PCT Filed: Oct. 30, 2008

(86) PCT No.: PCT/CN2008/072883
§ 371 (c)(1),
(2), (4) Date: Apr. 27, 2010

(87) PCT Pub. No.: WO2009/059546
PCT Pub. Date: May 14, 2009

(65) Prior Publication Data
US 2011/0314286 A1 Dec. 22, 2011

(30) Foreign Application Priority Data
Oct. 30, 2007 (CN) .......................... 2007 1 0018976

(51) Int. Cl.
*H04L 9/32* (2006.01)
(52) U.S. Cl. .................. 713/171; 713/170; 713/181
(58) Field of Classification Search .................. None
See application file for complete search history.

(56) References Cited

U.S. PATENT DOCUMENTS

| | | | |
|---|---|---|---|
| 7,907,936 B2 * | 3/2011 | Suzuki | 455/411 |
| 2007/0192600 A1 | 8/2007 | Wong et al. | |
| 2008/0045181 A1 | 2/2008 | Suzuki | |
| 2008/0226071 A1 * | 9/2008 | Braskich et al. | 380/258 |
| 2009/0031398 A1 * | 1/2009 | Zheng et al. | 726/3 |

FOREIGN PATENT DOCUMENTS

| | | |
|---|---|---|
| CN | 1668005 A | 9/2005 |
| CN | 1937489 A | 3/2007 |
| CN | 101127666 A | 2/2008 |
| CN | 101141254 A | 3/2008 |
| EP | 1890518 A2 | 2/2008 |
| JP | 3270579 A | 12/1991 |

OTHER PUBLICATIONS

Draft Supplement to Standard for Telecommunications and INformation Exchange Between Systems—LAN/MAN Specific Requirements—Part 11: Wireless Medium Access Control (MAC) and physical laywer (PHY) specifications: Specification for Enhanced Security, Nov. 2002, Institute of Electrical and Electronics Engineers, Inc.*

* cited by examiner

*Primary Examiner* — Philip Chea
*Assistant Examiner* — Trong Nguyen
(74) *Attorney, Agent, or Firm* — Harness, Dickey & Pierce, P.L.C.

(57) ABSTRACT

An access authentication method applying to IBSS network involves the following steps of: 1) performing authentication role configuration for network entities; 2) authenticating an authentication entity and a request entity that have been performed the authentication role configuration via an authentication protocol; and 3) after finishing the authentication, the authentication entity and the request entity perform the key negotiation, wherein, the message integrity check field and protocol synchronization lock-in field are added in a key negotiation message. The access authentication method applying to IBSS network provided by the invention has the advantages of the better safeness and the higher execution efficiency.

13 Claims, 1 Drawing Sheet

ACCESS AUTHENTICATION METHOD APPLYING TO IBSS NETWORK

CROSS-REFERENCE TO RELATED APPLICATIONS

This application is a 371 U.S. National Stage of International Application No. PCT/CN2008/072883, filed Oct. 30, 2008.

This application claims priority to Chinese Patent Application No. 200710018976.1, filed with the Chinese Patent Office on Oct. 30, 2007 and entitled "An access authentication method applying to IBSS network", which is hereby incorporated by reference in its entirety.

FIELD OF THE INVENTION

The present invention relates to an access authentication method applicable to an IBSS network.

BACKGROUND OF THE INVENTION

In order to address a security loophole presented in the Wired Equivalent Privacy (WEP) security mechanism defined in the Wireless Local Area Network (WLAN) international standard ISO/IEC 8802-11, the national standard of WLAN and the first revision thereof have been published in China to adopt the WLAN Authentication and Privacy Infrastructure (WAPI) instead of the WEP to address security issues of WLAN. Almost concurrently, the IEEE organization also has published the IEEE 802.11i standard in which the Robust Security Network Association (RSNA) has been proposed based upon backward compatibility to remedy the security loophole presented in the WEP.

The WAPI makes use of authentication and key management protocols of public-key certificates or a pre-shared key, and the RSNA performs authentication and key distribution functions respectively according to the IEEE 802.1x based upon the Extended Authentication Protocol (EAP) and the 4-way handshake protocol. The WAPI can ensure security of WLAN, and the RSNA also alleviates the security issue presented in the original security mechanism of WLAN but suffers from the following drawbacks:

1. Operating in an IBSS network mode causes the protocols to be executed too complexly, and node resources (a power supply, a CPU, a storage capability, etc.) over a network in such a mode are usually limited;

2. No protection measure is performed on the first messages of the unicast key negotiation protocol of the WAPI and 4-way handshake protocol of the RSNA, and an attacker may perform a Denial of Service (DoS) attack, e.g., protocol blocking, storage exhausting, etc., by forging message 1.

These two drawbacks will be analyzed and described in details below.

For convenient descriptions, functionally similar or identical terms in the WAPI and the RSNA will firstly be defined collectively as follows:

1. Supplicant (S). An Authentication Supplicant Entity (ASUE) of the WAPI and a Supplicant of the RSNA are referred collectively to as a Supplicant.

2. Authenticator (A). An Authenticator Entity (AE) of the WAPI and an Authenticator of the RSNA are referred collectively to as an Authenticator.

3. Authentication Server (AS). An Authentication Service Entity (ASE) of the WAPI and an Authentication Server (AS) of the RSNA are referred collectively to as an Authentication Server.

4. Master Key (MK). A Base Key (BK) of the WAPI protocol and a Pairwise Master Key (PMK) of the RSNA protocol are referred collectively to as a Master Key.

5. Unicast Key (UK). A Unicast Session Key (USK) of the WAPI protocol and a Pairwise Temporal Key (PTK) of the RSNA protocol are referred collectively to as a Unicast Key.

6. Group Key (GK). A Multicast Master Key (MMK) of the WAPI protocol and a Group Master Key (GMK) of the RSNA protocol are referred collectively to as a Group Key.

Two networking modes, i.e., a Basic Service Set (BSS) and an Independent BSS (IBSS), are provided for a WLAN. In the BSS mode, an Authenticator A resides at a wireless Access Point (AP), and a Supplicant S resides at a user terminal, and after an authentication function is performed through an Authentication Server AS, unicast key negotiation between the Authenticator A and the Supplicant S and group (including multicast and broadcast) key announcement of the Authenticator A are performed. In the IBSS mode, respective terminal users joining the network are peer, and the respective stations also need to transmit their own multicast/broadcast data in addition to unicast data between every two of them, that is, the respective stations act as the Authenticator A and perform group key announcement with other stations acting as the Supplicant S, respectively.

The same network element acting as both the Authenticator A and the Supplicant S may cause a reflection attack of the key management protocol, and in view of this, such an attack can be prevented in such a way that the same entity acts as two authentication roles based upon different pre-shared keys, that is, the key management protocol executed by the same entity acting as the Authenticator A and the Supplicant S shall depend upon different Master Keys MKs and Unicast Keys UKs. Therefore in the IBSS mode, the respective sites will act as the Authenticator A to execute the entire authentication and key management protocols with the other respective sites.

Referring to FIG. 1, the entire authentication and key management protocols have to be executed for N(N−1) times for an IBSS network with N nodes, and such highly complicated calculations may make the protocols be difficult to apply in practice when a node frequently moves or there are limited resources.

Not only the protocols are executed complexly in the IBSS mode, but also the key management protocol is subject to a DoS attack. The unicast key negotiation protocol of the WAPI and the 4-way handshake protocol of the RSNA are very crucial components in the security mechanism for the purpose of verifying whether there is a Master Key MK between the Authenticator A and the Supplicant S resulting from successful authentication and negotiation and of deriving a fresh Unicast Key UK for use in subsequent data communication. In the unicast key negotiation protocol of the WAPI and the 4-way handshake protocol of the RSNA, any other message than the message 1 are authenticated and protected by the UK resulting from latest negotiation, and the bare message 1 may be utilized by an attacker. The attacker can forge the message 1 so that the UK resulting from negotiation between the Authenticator A and the Supplicant S are not in consistency to thereby cause protocol blocking, or the attacker can forge a large number of messages 1 to thereby introduce a DoS attack, e.g., storage exhausting, etc., at the Supplicant S. Such a forgery attack is easy to be implemented with a serious hazard, and a single successful attack may counteract various previous authentication efforts.

SUMMARY OF THE INVENTION

In order to address the foregoing technical problem presented in the prior art, embodiments of the invention provide an access authentication method applicable to an IBSS network to guarantee enhanced security and execution efficiency of access authentication of the IBSS network.

A technical solution of the invention is an access authentication method applicable to an IBSS network, where the method includes:

step 1): configuring authentication roles of network entities;

step 2): authenticating an authenticator and a supplicant after authentication role configuration according to an authentication protocol; and step 3): performing key negotiation between the authenticator and the supplicant after the authentication is completed, where message integrity check and protocol synchronization lock fields are added in a key negotiation message.

Preferably, the role configuration includes static, adaptive or dynamic configuration.

Preferably, the static configuration includes configuring one of a pair of network entities as the authenticator and the other one as the supplicant.

Preferably, the adaptive configuration includes: if one of a pair of network entities determines that the opposite network entity is the authenticator, configuring adaptively the network entity as the supplicant, or if one of a pair of network entities determines that the opposite network entity is the supplicant, configuring adaptively the network entity as the authenticator.

Preferably, the dynamic configuration includes: configuring the network entities according to priority or physical address.

Preferably, configuring the network entities according to priority includes: configuring one of a pair of network entities which is highly prioritized as the authenticator and the other one as the supplicant.

Preferably, performing key negotiation between the authenticator and the supplicant includes: transmitting, by the authenticator, to the supplicant a key negotiation request packet, where the key negotiation request packet includes a Key Negotiation Identifier KNID, a one-time random number $Nonce_A$ generated by the authenticator and a Message Integrity Check MIC1, where the MIC1 is a hash value calculated on other fields in the key negotiation request packet than the MIC1 by the authenticator using a Master Key MK resulting from the authentication process between the authenticator and the supplicant; verifying, by the supplicant, upon reception of the key negotiation request packet, the key negotiation request packet, and if verification is passed, responding to the supplicant with a key negotiation response packet; otherwise, discarding the key negotiation request packet. Where the key negotiation response packet includes the Key Negotiation Identifier KNID, a one-time random number $Nonce_S$ generated by the supplicant, group key information $E(UK,GK_S)$ of the supplicant and a message integrity check MIC2, where the $E(UK,GK_S)$ represents information resulting from encryption of a group key $GK_S$ of the supplicant using a unicast key UK, the UK is a value calculated from the MK, the $Nonce_A$ and the $Nonce_S$, and the MIC2 is a hash value calculated on other fields in the key negotiation response packet than the MIC2 by the supplicant using the UK resulting from negotiation; verifying, by the authenticator, upon reception of the key negotiation response packet, the key negotiation response packet, and if verification is passed, decrypting the $E(UK, GK_S)$ field, obtaining the $GK_S$ and responding to the supplicant with a key negotiation acknowledgement packet; otherwise, discarding the key negotiation response packet. Where the key negotiation acknowledgement packet includes the Key Negotiation Identifier KNID, group key information $E(UK,GK_A)$ of the authenticator and a Message Integrity Check MIC3, where the $E(UK,GK_A)$ represents information resulting from encryption of a group key $GK_A$ of the authenticator using the unicast key UK, and the MIC3 is a hash value calculated on other fields in the key negotiation acknowledgement packet than the MIC3 by the authenticator using the UK; and verifying, by the supplicant, upon reception of the key negotiation acknowledgement packet, the key negotiation acknowledgement packet, and if verification is passed, decrypting the $E(UK,GK_A)$ field and obtaining the $GK_A$; otherwise, discarding the key negotiation acknowledgement packet.

Preferably, verifying the key negotiation request packet during an initial key negotiation process includes: verifying whether the MIC1 in the key negotiation request packet is correct, and if so, passing verification; otherwise failing verification.

Preferably, verifying the key negotiation request packet during a key updating process includes: verifying whether the KNID and the MIC1 in the key negotiation request packet are correct, and if so, passing verification; otherwise failing verification.

Preferably, verifying the key negotiation response packet includes: verifying whether the KNID and the MIC2 in the key negotiation response packet are correct, and if so, passing verification; otherwise failing verification.

Preferably, verifying the key negotiation acknowledgement packet includes: verifying whether the KNID and the MIC3 in the key negotiation acknowledgement packet are correct, and if so, passing verification; otherwise failing verification.

Preferably, the authentication protocol includes the authentication protocol of the WAPI or the IEEE 802.1x protocol of the RSNA.

The invention has the following advantages:

1. Highly Efficient execution. In order to reduce complexity of executing the protocols in the IBSS mode, the invention proposes a method for configuring roles of network entities, that is, configuring statically roles of respective station or configuring adaptively or dynamically roles of respective station according to a operation condition of the network. After an adaptive role policy is adopted for the network entities, respective ones of a pair of stations performing authentication and key management functions play a relatively definite role of either an authenticator or a supplicant, that is, the entire process of the protocols will be executed only once between the pair of stations to thereby accomplish bidirectional identity authentication and key distribution as required. For a network with N nodes, an authentication function is performed between every two ones to thereby reduce by one half the number of times that the protocols are executed as N(N−1).

2. Enhanced security. In view of the issue of a DoS attack presented in the key management protocol, the invention improves the design of the protocols by adopting modular and combinable method and adds message integrity check and protocol synchronization lock fields in a message to thereby enhance security and robustness of the protocols and address the issue of a DoS attack presented in the key management protocol in the existing wireless local area network WAPI and RSNA security mechanism.

DETAILED DESCRIPTION OF THE INVENTION

Figure 1:
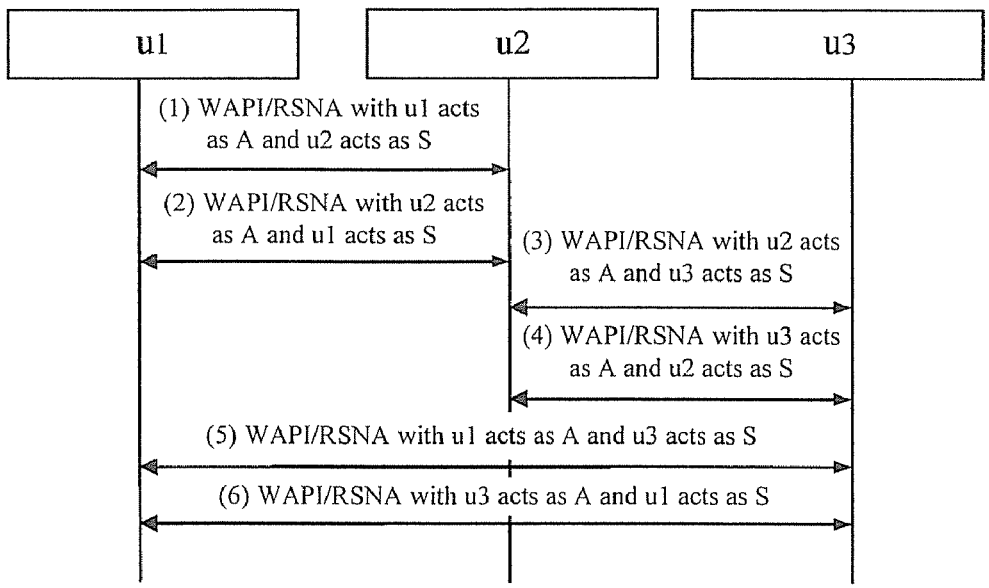
FIG. 1 is a schematic diagram of executing a protocol over an IBSS network consisting of three sites u1, u2 and u3 in the prior art.

In order to make the foregoing object, features and advantages of the invention more apparent, embodiments of the invention will be detailed below with reference to the drawings.

The invention configures roles of network entities in order to reduce complexity of executing the protocols of WAPI and RSNA in the IBSS mode and in view of the issue of a DoS attack presented in the key management protocol, the invention improves the design of the protocols by adopting modular and combinable method. The improved protocols are constituted of two parts: the first part is the original WAPI authentication protocol or the EAP-based IEEE 802.1x protocol to perform identity authentication and Master Key MK negotiation between an Authenticator A and a Supplicant S, and the second part is a newly designed key management protocol in place of the key management protocol of the WAPI or the 4-way handshake of the RSNA to perform negotiation of a Unicast Key UK and announcement of a Group Key GK. The improved protocol based upon the WAPI protocol is referred to as WAPI', and the improved protocol based upon the RSNA protocol is referred to as RSNA'.

A specific flow of an access authentication method is as follows:

1) Authentication roles of network entities are configured.

Role configuration can be static, adaptive or dynamic configuration.

In the case of static configuration, the configuration includes configuring one of a pair of network entities as an Authenticator A and the other one as a Supplicant S.

In the case of adaptive configuration, the configuration includes adapting the authentication role of an entity adopting an adaptive role configuration policy to an opposite entity so that the entity is configured adaptively as a Supplicant S if the opposite entity is an Authenticator A or as an Authenticator A if the opposite entity is a Supplicant S.

In the case of dynamic configuration, the configuration includes configuring according to priority and physical address, that is, a highly prioritized entity is configured as an Authenticator A and the other entity is configured as a Supplicant S; if the priorities of two entities are identical, one of the entities with a bigger physical address is configured as an Authenticator A and the other one with a smaller physical address is configured as a Supplicant S. The invention can alternatively adopt other dynamic configuration policies.

2) The Authenticator A and the Supplicant S after role configuration are authenticated according to an authentication protocol.

The authentication protocol refers to the authentication protocol of the WAPI or the IEEE 802.1x protocol of the RSNA.

3) The Authenticator A and the Supplicant S perform key negotiation after the authentication protocol is executed, where message integrity check and protocol synchronization lock fields are added in a key negotiation message. Specific steps of key negotiation are as follows:

3.1) Upon successful entity authentication, the Authenticator A transmits to the Supplicant S a key negotiation request packet including a Key Negotiation Identifier KNID, a Nonce$_A$ generated by the Authenticator A and a Message Integrity Check MIC1, where the MIC1 is a hash value calculated on other fields in the key negotiation request packet than the MIC1 by the Authenticator A using a Master Key MK resulting from the authentication process.

3.2) Upon reception of the key negotiation request packet, the Supplicant S verifies the key negotiation request packet for correctness of the MIC1 therein, and if the MIC1 is incorrect, the Supplicant S discards the key negotiation request packet directly; otherwise, the Supplicant S responds to the Authenticator A with a key negotiation response packet including the Key Negotiation Identifier KNID, a one-time random number Nonce$_S$ generated by the Supplicant S, group key information E(UK, GK$_S$) at the Supplicant S and a message integrity check MIC2, where the MIC2 is a hash value calculated on other fields in the key negotiation response packet than the MIC2 by the Supplicant S using the UK, the UK is a value calculated from the MK, the Nonce$_A$ and the Nonce$_S$, and the E(UK,GK$_S$) represents information resulting from encryption of a group key GK$_S$ of the Supplicant S using a unicast key UK.

3.3) Upon reception of the key negotiation response packet, the Authenticator A verifies the key negotiation response packet for correctness of the Key Negotiation Identifier KNID therein, and if the KNID is incorrect, the Authenticator A discards the key negotiation response packet directly; otherwise, the Authenticator A calculates the UK from the MK, the Nonce$_A$ and the Nonce$_S$ and verifies the MIC2 for correctness by the UK, and if the MIC2 is incorrect, the Authenticator A discards the key negotiation response packet directly; otherwise, the Authenticator A decrypts the E(UK GK$_S$) field and obtains the GK$_S$ and responds to the Supplicant S with a key negotiation acknowledgement packet including the Key Negotiation Identifier KNID, group key information E(UK,GK$_A$) of the Authenticator A and a Message Integrity Check MIC3, where the E(UK,GK$_A$) represents information resulting from encryption of a group key GK$_A$ of the Authenticator A using the unicast key UK, and the MIC3 is a hash value calculated on other fields in the key negotiation acknowledgement packet than the MIC3 by the Authenticator A using the UK.

3.4) Upon reception of the key negotiation acknowledgement packet, the Supplicant S verifies the key negotiation acknowledgement packet and verifies the Key Nagotiation Identifier KNID and the MIC3 therein for correctness, and if they are incorrect, the Supplicant S discards the packet directly; otherwise, the Supplicant S decrypts the E(GK$_A$) and obtains the GK$_A$ It shall be noted that the Key Negotiation Identifier KNID functions as a protocol synchronization lock in the key negotiation protocol. The KNID in the initial key negotiation protocol upon successful authentication is a random number generated by the Authenticator A, and the KNIDs in the key updating processes are values calculated respectively by the Authenticator A and the Supplicant S locally from the UK, the Nonce$_A$, the Nonce$_S$, the GK$_A$ and the GK$_S$ after the last key negotiation protocol succeeds. Therefore during the key updating process, verification of the key negotiation request packet by the Supplicant S shall further include verification of the KNID. Such a design of the KNID enables the Authenticator A and the Supplicant S to perform a synchronization function and prevent an attacker from forging and replaying the key negotiation request packet.

Figure 2:
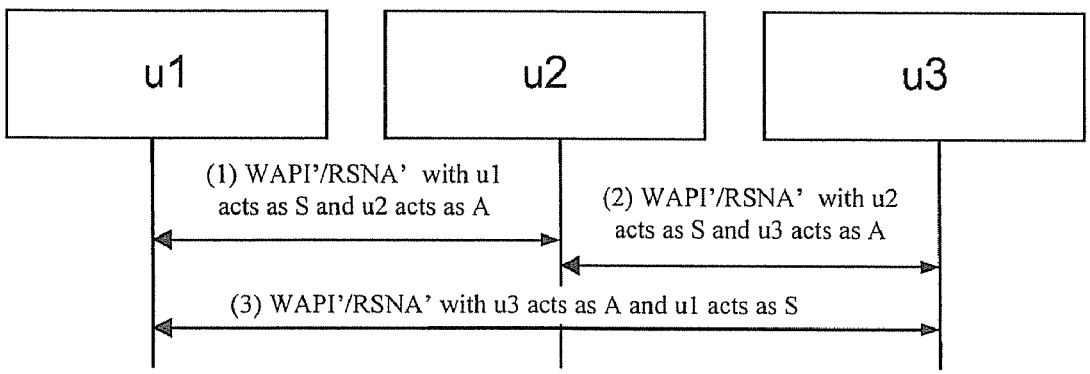
FIG. 2 is a schematic diagram of executing an access authentication protocol over an IBSS network consisting of three sites u1, u2 and u3 according to the invention.

FIG. 2 is a schematic diagram of executing an improved protocol over an IBSS network consisting of three sites. It is assumed that each of the three sites adopts adaptive configuration of authentication role and the three sites are equally prioritized and assigned with respective MAC addresses 00:90:4b:00:90:01, 00:90:4b:00:90:02 and 00:90:4b:00:90:03, so authentication between the three sites can be done by performing authentication for three times using the MAC addresses of the three sites according to the invention.

What is claimed is:

1. An access authentication method applicable to an Independent Basic Service Set (IBSS) network, comprising:
   step 1): configuring authentication roles of network entities;
   step 2): authenticating an authenticator and a supplicant after the authentication role configuration according to an authentication protocol; and
   step 3): performing key negotiation, by the authenticator and the supplicant, after the authentication is successfully completed, wherein a message integrity check field and a protocol synchronization lock field are added in a key negotiation message,
   wherein the protocol synchronization lock field includes a Key Negotiation Identifier KNID;
   wherein a KNID in a key negotiation request packet transmitted from the authenticator to the supplicant in an initial key negotiation protocol upon the successful authentication is a random number generated by the authenticator;
   wherein KNIDs in key updating processes are calculated respectively by the authenticator and the supplicant locally from a unicast key UK a $Nonce_A$ generated by the authenticator, a $Nonce_S$ generated by the supplicant, a group key $GK_A$ of the authenticator, and a group key $GK_S$ of the supplicant after a last key negotiation protocol succeeds;
   wherein during a key updating process, verification of the key negotiation request packet by the supplicant further includes verification of the KNID; and
   wherein the KNIDs enable the authenticator and the supplicant to perform a synchronization function and prevent an attacker from forging and replaying the key negotiation request packet.

2. The method according to claim 1, wherein the role configuration comprises static, adaptive or dynamic configuration.

3. The method according to claim 2, wherein the static configuration comprises:
   configuring one of a pair of network entities as the authenticator and the other one as the supplicant.

4. The method according to claim 2, wherein the adaptive configuration comprises:
   if one of a pair of network entities determines that the opposite network entity is the authenticator, configuring adaptively the one of the pair of network entities as the supplicant, or if one of a pair of network entities determines that the opposite network entity is the supplicant, configuring adaptively the one of the pair of network entities as the authenticator.

5. The method according to claim 2, wherein the dynamic configuration comprises:
   configuring the network entities according to priority or physical address.

6. The method according to claim 5, wherein configuring the network entities according to priority comprises:
   configuring one of a pair of network entities which is highly prioritized as the authenticator and the other one as the supplicant.

7. The method according to claim 5, wherein configuring the network entities according to physical address comprises:
   if priorities of a pair of network entities are identical, configuring one of the network entities with a bigger physical address as the authenticator and the other one as the supplicant.

8. The method according to claim 1, wherein performing key negotiation between the authenticator and the supplicant comprises:
   transmitting, by the authenticator, to the supplicant a key negotiation request packet, wherein the key negotiation request packet comprises a Key Negotiation Identifier KNID, a one-time random number NonceA generated by the authenticator and a Message Integrity Check MIC1, wherein the MIC1 is a hash value calculated on fields in the key negotiation request packet except the MIC1 by the authenticator using a Master Key MK resulting from negotiation;
   verifying, by the supplicant, upon reception of the key negotiation request packet, the key negotiation request packet, and if verification is passed, responding to the authenticator with a key negotiation response packet; otherwise, discarding the key negotiation request packet, wherein the key negotiation response packet comprises the Key Negotiation Identifier KNID, a one-time random number NonceS generated by the supplicant, group key information E(UK,GKS) of the supplicant and a message integrity check MIC2, wherein the E(UK,GKS) represents information resulting from encryption of a group key GKS of the supplicant using a unicast key UK, the UK is a value calculated from the MK, the NonceA and the NonceS, and the MIC2 is a hash value calculated on fields in the key negotiation response packet except the MIC2 by the supplicant using the UK;
   verifying, by the authenticator, upon reception of the key negotiation response packet, the key negotiation response packet, and if verification is passed, decrypting the E(UK,GKS) field, obtaining the GKS and responding to the supplicant with a key negotiation acknowledgement packet; otherwise, discarding the key negotiation response packet, wherein the key negotiation acknowledgement packet comprises the Key Negotiation Identifier KNID, group key information E(UK, GKA) of the authenticator and a Message Integrity Check MIC3, wherein the E(UK,GKA) represents information resulting from encryption of a group key GKA of the authenticator using the unicast key UK, and the MIC3 is a hash value calculated on fields in the key negotiation acknowledgement packet except the MIC3 by the authenticator using the UK; and
   verifying, by the supplicant, upon reception of the key negotiation acknowledgement packet, the key negotiation acknowledgement packet, and if verification is passed, decrypting the E(UK,GKA) field and obtaining the GKA;
   otherwise, discarding the key negotiation acknowledgement packet.

9. The method according to claim 8, wherein verifying the key negotiation request packet during an initial key negotiation process comprises:
   verifying whether the MIC1 in the key negotiation request packet is correct, and if so, passing verification; otherwise failing verification.

10. The method according to claim 8, wherein verifying the key negotiation request packet during a key updating process comprises:
    verifying whether the KNID and the MIC1 in the key negotiation request packet are correct, and if so, passing verification; otherwise failing verification.

11. The method according to claim 8, wherein verifying the key negotiation response packet comprises:

verifying whether the KNID and the MIC2 in the key negotiation response packet are correct, and if so, passing verification; otherwise failing verification.

12. The method according to claim 8, wherein verifying the key negotiation acknowledgement packet comprises:
verifying whether the KNID and the MIC3 in the key negotiation acknowledgement packet are correct, and if so, passing verification; otherwise failing verification.

13. The method according to claim 1, wherein the authentication protocol comprises an authentication protocol of Wireless Local Area Network Authentication and Privacy Infrastructure (WAPI) or an IEEE 802.1x protocol of Robust Security Network Association (RSNA).

* * * * *